(12) United States Patent
Cornea-Hasegan (10) Patent No.: US 8,868,632 B2
(45) Date of Patent: *Oct. 21, 2014

(54) METHODS AND APPARATUS FOR PREDICTING AN UNDERFLOW CONDITION ASSOCIATED WITH A FLOATING-POINT MULTIPLY-ADD OPERATION

(75) Inventor: Marius A. Cornea-Hasegan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2039 days.

This patent is subject to a terminal disclaimer.

(21) Appl. No.: 11/227,463

(22) Filed: Sep. 15, 2005

(65) Prior Publication Data

US 2006/0031271 A1 Feb. 9, 2006

Related U.S. Application Data

(63) Continuation of application No. 10/118,348, filed on Apr. 8, 2002, now Pat. No. 6,963,894.

(51) Int. Cl.
*G06F 7/38* (2006.01)
*G06F 7/544* (2006.01)

(52) U.S. Cl.
CPC .................................. *G06F 7/5443* (2013.01)
USPC .......................................... 708/553; 708/501

(58) Field of Classification Search
CPC .............................. G06F 7/499; G06F 7/4991
USPC ........................ 708/498, 525, 553, 501, 552
See application file for complete search history.

(56) References Cited

U.S. PATENT DOCUMENTS

| 4,647,401 A | 3/1987 | Gradeff et al. |
|---|---|---|
| 5,257,216 A | 10/1993 | Sweedler |
| 5,548,545 A | 8/1996 | Brashears et al. |
| 5,550,767 A | 8/1996 | Taborn et al. |
| 5,553,015 A * | 9/1996 | Elliott et al. .................. 708/498 |
| 5,886,915 A | 3/1999 | Sharangpani et al. |
| 5,892,697 A | 4/1999 | Brakefield |
| 6,105,047 A | 8/2000 | Sharangpani et al. |
| 6,571,265 B1 | 5/2003 | Story |
| 6,631,392 B1 | 10/2003 | Jiang et al. |
| 6,633,895 B1 | 10/2003 | Bass et al. |
| 6,963,894 B2 | 11/2005 | Cornea-Hasegan |
| 6,993,549 B2 | 1/2006 | Steele, Jr. |
| 7,272,623 B2 | 9/2007 | Cornea-Hasegan |
| 2006/0031271 A1 | 2/2006 | Cornea-Hasegan |

OTHER PUBLICATIONS

Steve Hollasch, "IEEE Standard 754 Floating Point Numbers," Dec. 4, 2001, [retrieved from http://research.microsoft.com/~hollasch/cgindex/coding/ieeefloat.html] (8 pages).

(Continued)

*Primary Examiner* — Chuong D Ngo
(74) *Attorney, Agent, or Firm* — Blakely, Sokoloff, Taylor & Zafman LLP (57) ABSTRACT

Methods and apparatus for predicting an underflow condition associated with a floating-point multiply-add operation are disclosed. An example apparatus obtains a first operand value and a second operand value. The example apparatus then determines if the second operand value subtracted from the first operand value is greater than a minimum value and determines if the first operand value is greater than a sum value associated with a minimum operand value. The example apparatus then asserts an output signal indicative of an absence of an underflow condition associated with a floating-point value based on conditions associated with determining whether the second operand value subtracted from the first operand value is greater than the minimum value and determining if the first operand value is greater than the sum value.

14 Claims, 4 Drawing Sheets

(56) References Cited

OTHER PUBLICATIONS

Cornea-Hasegan, Marius A., "Correctness Proofs Outline for Newton-Raphson Based Floating-Point Divide and Square Root Algorithms," Proceedings of the 14th IEEE Symposium on Computer Arithmetic, Apr. 14-16, 1999 (pp. 96-105).

Intel Itanium Architecture Software Developer's Manual, vol. 1: Application Architecture, Revision 2.0, Document No. 245317-003, pp. i-xii, 1:1-1:8, 1:77-1:102, 1:129-1:130, 1:193-1:206, and Index-1 to Index-12 (Dec. 2001).

Intel Itanium Architecture Software Developer's Manual, vol. 2: System Architecture, Revision 2.0, Document No. 245318-003, pp. i-xviii, 2:1-2:8, 2:371-2:374, 2:451-2:456, and Index-1 to Index-12 (Dec. 2001).

Intel Itanium Architecture Software Developer's Manual, vol. 3: Instruction Set Reference, Revision 2.0, Document No. 245319-003, pp. i-xii, 3:1-3:8, 3:71, 3:79-3:80, 3:83, and Index-1 to Index-12 (Dec. 2001).

Intel® IA-64 Architecture Software Developer's Manual, vol. 1: IA-64 Application Architecture, Revision 1.1, Document No. 245317-002, pp. 5.1-5.24 (Jul. 2000).

* cited by examiner

METHODS AND APPARATUS FOR PREDICTING AN UNDERFLOW CONDITION ASSOCIATED WITH A FLOATING-POINT MULTIPLY-ADD OPERATION

RELATED APPLICATION

The issued patent is a continuation of U.S. patent application Ser. No. 10/118,348, filed on Apr. 8, 2002 now U.S. Pat. No. 6,963,894.

TECHNICAL FIELD

The present invention relates in general to microprocessors, and, in particular, to methods and apparatus for predicting an underflow condition associated with a floating-point multiply-add operation.

BACKGROUND

Microprocessors are frequently required to perform mathematical operations using floating-point numbers. Often, a specialized hardware circuit (i.e., a floating-point unit) is included in the microprocessor (or electrically coupled to the microprocessor) to perform these floating-point multiply-add operations. By using a floating-point unit, floating-point multiply-add operations may be performed faster than if they were performed in software, and the software execution unit of the microprocessor is free to execute other operations.

However, when floating-point numbers are used in mathematical operations, the result of the operation may be too large or too small to be represented by the floating-point unit. When the result is too large to be represented by the floating-point unit, an 'overflow' condition occurs. When the result is too small to be represented by the floating-point unit, an 'underflow' condition occurs. In either case (overflow or underflow), a software routine must be executed to perform the operation if accurate results are required. In such an instance, the system is burdened by the overhead of both the execution time of the floating-point unit and the execution time of the software routine even though only a single floating-point multiply-add operation is performed.

DETAILED DESCRIPTION OF EXAMPLES

In general, the methods and apparatus described herein predict an underflow condition associated with a floating-point multiply-add operation. Preferably, the prediction is "pessimistic" in that it predicts that an underflow condition will result in all situations where an underflow condition will result. However, the methods and apparatus may also predict that an underflow condition will result in some situations where an underflow condition will not result. If an underflow condition is predicted, the floating-point multiply-add operation is preferably performed by a software routine capable of handling the underflow condition. If an underflow condition is not predicted, the floating-point multiply-add operation is preferably performed by a hardware circuit to increase speed and reduce computational overhead.

Figure 1:
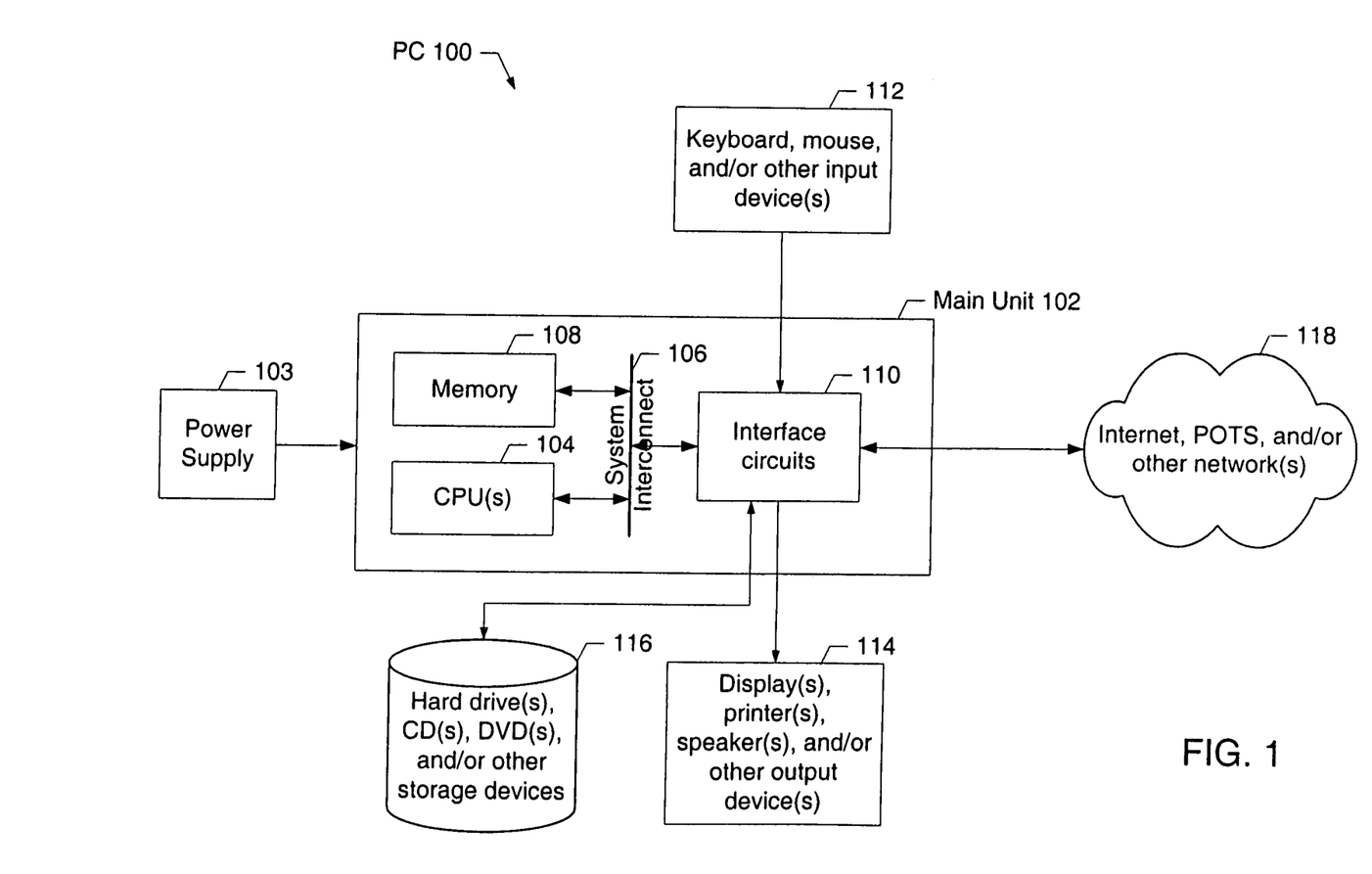
FIG. 1 is a high level block diagram of a computer system illustrating an environment of use for the present invention.

A block diagram of a computer system 100 is illustrated in FIG. 1. The computer system 100 may be a personal computer (PC), a personal digital assistant (PDA), an Internet appliance, a cellular telephone, or any other computing device. In the illustrated example, the computer system 100 includes a main processing unit 102 powered by a power supply 103. The main processing unit 102 may include one or more central processing units (CPUs) 104 electrically coupled by a system interconnect 106 to one or more memory device(s) 108 and one or more interface circuits 110. In the illustrated example, the system interconnect 106 is an address/data bus. Of course, a person of ordinary skill in the art will readily appreciate that interconnects other than busses may be used to connect the CPU(s) 104 to the memory device(s) 108. For example, one or more dedicated lines and/or a crossbar may be used to connect the CPU(s) 104 to the memory device(s) 108.

The CPU(s) 104 may include any type of well known microprocessor, such as a microprocessor from the Intel Pentium™ family of microprocessors, the Intel Itanium™ family of microprocessors, and/or the Intel XScale™ family of processors. The main memory device 108 may include dynamic random access memory (DRAM), but may also include non-volatile memory. In the illustrated example, the memory device(s) 108 store a software program which is executed by one or more of the CPU(s) 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be a cathode ray tube (CRTs), a liquid crystal display (LCDs), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
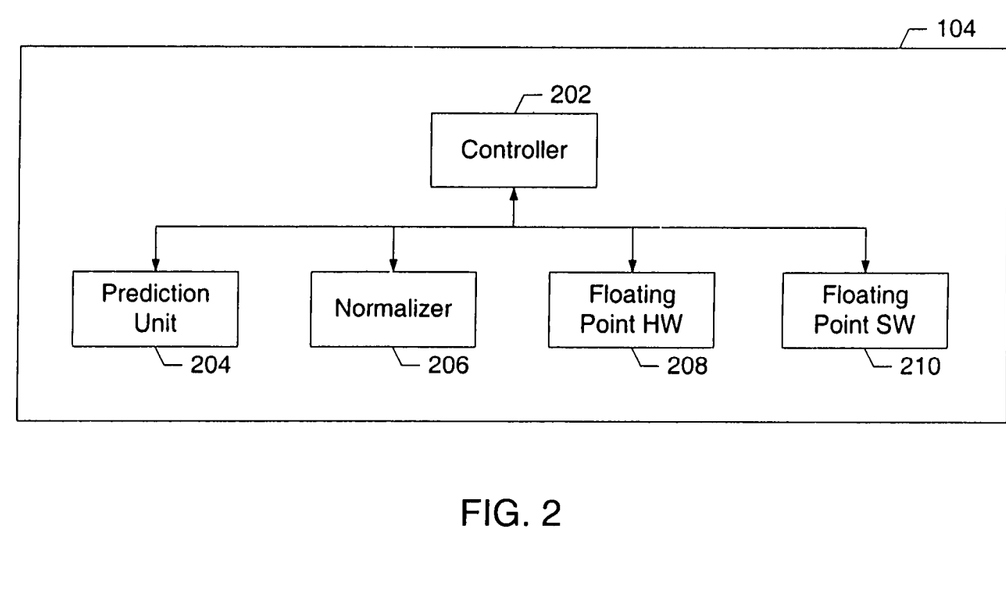
FIG. 2 is a more detailed block diagram of a CPU illustrated in FIG. 1.

A more detailed block diagram of the CPU 104 is illustrated in FIG. 2. Preferably, the CPU 104 includes a controller 202, a prediction unit 204, a normalizer 206, a floating-point hardware unit 208, and a floating-point software unit 210. The floating-point hardware unit 208 may be implemented by conventional electronic circuitry in a well known manner. The floating-point software unit 210 may be implemented by a microprocessor executing software instructions in a well known manner. The controller 202, the prediction unit 204, and the normalizer 206 may be implemented by a microprocessor executing software instructions and/or conventional electronic circuitry. In addition, a person of ordinary skill in the art will readily appreciate that certain modules may be combined or divided according to customary design constraints. Still further, one or more of these modules 202-208 may be located external to the CPU 104.

For the purpose of controlling the interaction of the prediction unit 204, the normalizer 206, the floating-point hardware unit 208, and the floating-point software unit 210, the CPU 104 includes a controller 202. The controller 202 is operatively coupled to the prediction unit 204, the normalizer 206, the floating-point hardware unit 208, and the floating-point software unit 210 in a well known manner. For example, one set of software instructions may be operatively coupled to another set of software instructions via a subroutine call, parameter passing, and/or shared memory location(s). In another example, one piece of electronic circuitry may be operatively coupled to another piece of electronic circuitry via electrical signal line(s) such as a bus. In yet another example, a set of software instructions may be operatively coupled to a piece of electronic circuitry via electrical signal line(s) stimulated by a microprocessor executing the software instructions.

For the purpose of predicting an underflow condition associated with a floating-point multiply-add operation, the CPU 104 includes a prediction unit 204. The prediction unit 204 may be implemented in hardware (see FIG. 3) or software (see FIG. 4). The prediction unit 204 is structured to assert an output signal indicative of the absence of the underflow condition. Conversely, the same prediction unit 204 is also structured to assert an output signal indicative of a possible underflow condition. In other words, the logic level of the output signal is not material as long as subsequent circuit(s) and/or software routine(s) are structured using the same logical convention.

Floating-point numbers are represented in scientific notation (e.g., $1.01 \times 2^3$). Accordingly, a floating number includes a sign (e.g., positive), a significand (e.g., 1.01), a base (e.g., 2) and an exponent (e.g., 3). In a binary floating-point system, a sign bit of '0' denotes a positive value and a sign bit of '1' denotes a negative value. In a binary system, a base of 2 is presumed and not stored. In many binary floating-point systems, numbers are stored and/or manipulated in 'normalized' form (i.e., the radix point is located immediately after the first non-zero digit). In such an instance, a leading '1' may be presumed and not stored (e.g., as in IEEE Standard for Binary Floating-Point Arithmetic—ANSI/IEEE Standard 754-1985).

When floating-point numbers are used in mathematical operations, the result of the operation may be too large or too small to be represented by the floating-point system. When the result is too large to be represented by the floating-point system, an 'overflow' condition occurs. When the result is too small to be represented by the floating-point system, an 'underflow' condition occurs. Underflow and overflow conditions occur when the exponent of the result is beyond the maximum value (e.g., 127 for single-precision and 1023 for double-precision), and the significand is all 1s (including the normalizing '1' bit).

In this case, the floating-point multiply-add operation operates on three floating-point numbers (e.g., A+B*C). In such an instance, the operation includes a first operand exponent (ea), a second operand exponent (eb), and a third operand exponent (ec). Each of the operand exponents (ea, eb, and ec) has a predefined minimum value (emin). In addition, each of the operand exponents (ea, eb, and ec) is associated with a separate significand. Each significand has a predefined number of significant bits (N1). The result of the floating-point multiply-add operation is also associated with a significand. The significand of the result also has a predetermined number of significant bits (N2). N1 is greater than or equal to N2.

Preferably, the prediction unit 204 is structured to assert an output signal indicative of the absence of the underflow condition if at least one of the following conditions is true:

$$(eb+ec-ea) <= (-3) \text{ and } (ea) >= (emin+1); \quad \text{(i)}$$

$$(-2) <= (eb+ec-ea) <= (0) \text{ and } (eb+ec) >= (emin+2*N1-2+2*(N1-N2)) \quad \text{(ii)}$$

$$(eb+ec-ea) = (1) \text{ and } (ea) >= (emin+N1-1+(N1-N2)); \quad \text{(iii)}$$

$$(2) <= (eb+ec-ea) <= (N1-2) \text{ and } (ea) >= (emin-1); \quad \text{(iv)}$$

$$(N1-1) <= (eb+ec-ea) \text{ and } (eb+ec) >= (emin+1); \quad \text{(v)}$$

$$(ea) <= (emin-1) \text{ and } (eb+ec) >= (emin+1). \quad \text{(vi)}$$

For the purpose of normalizing one or more floating-point numbers, the CPU 104 includes a normalizer 206. Preferably, the normalizer 206 shifts the position of the radix point to be immediately after an implied '1' by adjusting an associated exponent value in a well known manner.

For the purpose of performing one or more floating-point multiply-add operations, the CPU 104 includes a floating-point hardware unit 208. The floating-point hardware unit 208 is a well known circuit capable of quickly performing one or more predetermined floating-point multiply-add operations. However, the range of the floating-point hardware unit 208 is inherently limited by some predetermined number of bits used to represent the floating-point numbers used in the floating-point multiply-add operations.

For the purpose of performing one or more floating-point multiply-add operations, the CPU 104 also includes a floating-point software unit 210. Preferably, the floating-point software unit 210 is capable of handling larger and/or smaller floating-point results than the floating-point hardware unit 208. However, the floating-point software unit 210 is typically slower than the floating-point hardware unit 208.

Figure 3:
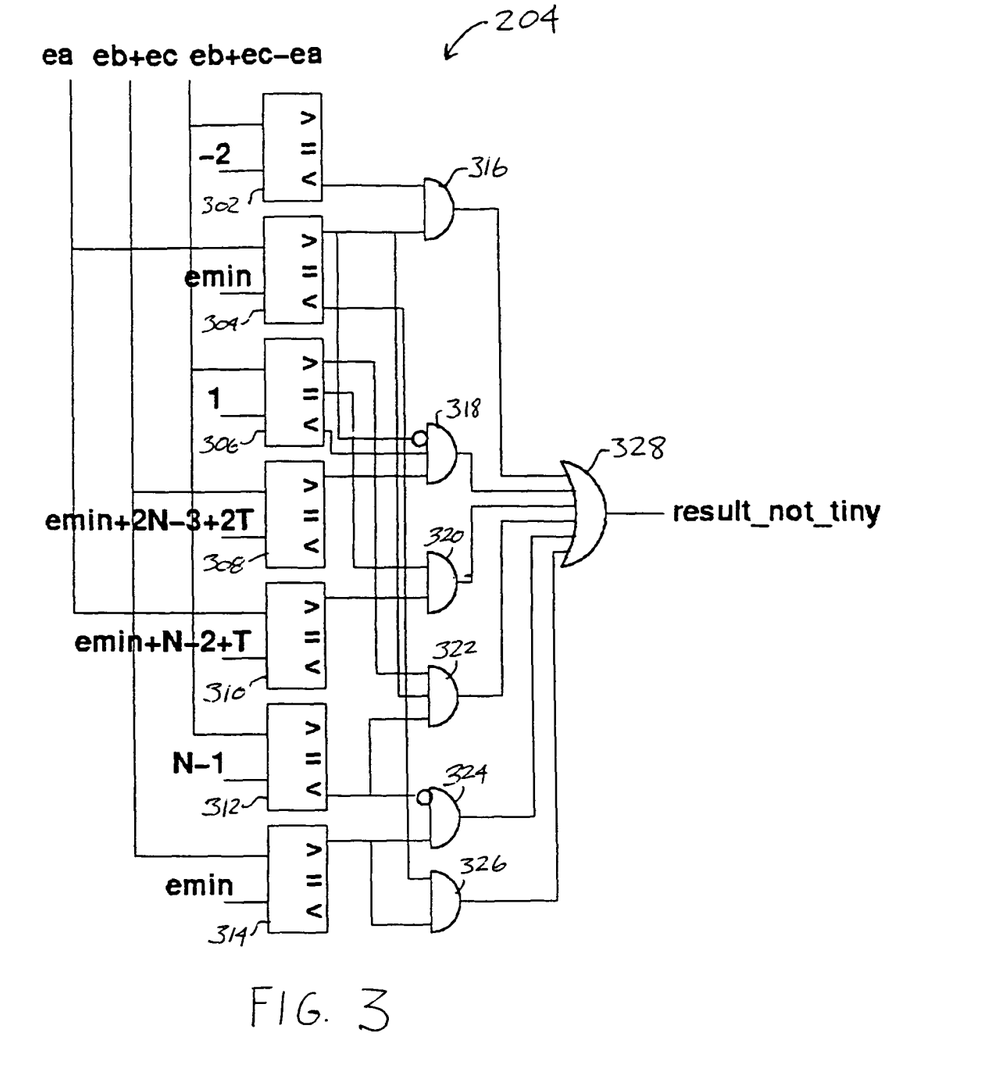
FIG. 3 is a block diagram of a logic circuit for predicting an underflow condition associated with a floating-point multiply-add operation.

A more detailed block diagram of the prediction unit 204 is illustrated in FIG. 3. The prediction unit 204 is a logic circuit for predicting a possible underflow condition associated with a floating-point multiply-add operation. In this example, the prediction unit 204 includes seven comparators 302-314, six logic-AND gates 316-326, and one logic-OR gate 328. Of course, a person of ordinary skill in the art will readily appreciate that many different circuits could be employed to achieve the same result.

As discussed above, the floating-point multiply-add operation operates on three floating-point numbers (e.g., A+B*C). In such an instance, the operation includes a first operand exponent (ea), a second operand exponent (eb), and a third operand exponent (ec). Each of the operand exponents (ea, eb, and ec) has a predefined minimum value (emin). In addition, each of the operand exponents (ea, eb, and ec) is associated with a separate significand. Each significand has a predefined number of significant bits (N1). The result of the floating-point multiply-add operation is also associated with a significand. The significand of the result also has a predetermined number of significant bits (N2).

Each of these numbers (ea, eb, ec, emin, N1, and N2) as well as mathematical combinations of these numbers (e.g., eb+ec) may be available to the prediction unit 204 in a well known manner. For example, a number may be retrieved from memory 108 and placed on the system interconnect 106. Similarly, one or more numbers may be retrieved from memory 108, combined mathematically by hardware and/or software, and the result placed on the system interconnect 106. (note: T=N1−N2).

Turning to the prediction unit 204 as illustrated in FIG. 3, the first logic-AND gate 316 is electrically connected to the first comparator 302 and the second comparator 304. The first comparator 302 and the second comparator 304 are electrically connected to data busses representing numbers. The arrangement of the first logic-AND gate 316, the first comparator 302, the second comparator 304, and the data busses is structured to produce a predetermined output signal from the first logic-AND gate 316 if $(eb+ec-ea)<=(-3)$ and $(ea)>=(emin+1)$.

The second logic-AND gate 318 is electrically connected to the third comparator 306 and the fourth comparator 308. The third comparator 306 and the fourth comparator 308 are electrically connected to data busses representing numbers. The arrangement of the second logic-AND gate 318, the third comparator 306, the fourth comparator 308, and the data busses is structured to produce a predetermined output signal from the second logic-AND gate 318 if $(-2)<=(eb+ec-ea)<=(0)$ and $(eb+ec)>=(emin+2*N1-2+2*(N1-N2))$.

The third logic-AND gate 320 is electrically connected to the third comparator 306 and the fifth comparator 310. The third comparator 306 and the fifth comparator 310 are electrically connected to data busses representing numbers. The arrangement of the third logic-AND gate 320, the third comparator 306, the fifth comparator 310, and the data busses is structured to produce a predetermined output signal from the third logic-AND gate 320 if $(eb+ec-ea)=(1)$ and $(ea)>=(emin+N1-1+(N1-N2))$.

The fourth logic-AND gate 322 is electrically connected to the third comparator 306 and the sixth comparator 312. The third comparator 306 and the sixth comparator 312 are electrically connected to data busses representing numbers. The arrangement of the fourth logic-AND gate 322, the third comparator 306, the sixth comparator 312, and the data busses is structured to produce a predetermined output signal from the fourth logic-AND gate 322 if $(2)<=(eb+ec-ea)<=(N1-2)$ and $(ea)>=(emin-1)$.

The fifth logic-AND gate 324 is electrically connected to the sixth comparator 312 and the seventh comparator 314. The sixth comparator 312 and the seventh comparator 314 are electrically connected to data busses representing numbers. The arrangement of the fifth logic-AND gate 324, the sixth comparator 312, the seventh comparator 314, and the data busses is structured to produce a predetermined output signal from the fifth logic-AND gate 324 if $(N1-1)<=(eb+ec-ea)$ and $(eb+ec)>=(emin+1)$.

The sixth logic-AND gate 326 is electrically connected to the second comparator 304 and the seventh comparator 314. The second comparator 304 and the seventh comparator 314 are electrically connected to data busses representing numbers. The arrangement of the sixth logic-AND gate 326, the second comparator 304, the seventh comparator 314, and the data busses is structured to produce a predetermined output signal from the sixth logic-AND gate 326 if $(ea)<=(emin-1)$ and $(eb+ec)>=(emin+1)$.

The output of each of the logic-AND gates 316-326 is preferably fed into the logic-OR gate 328. As a result, the output of the logic-OR gate 328 predicts the presence of a possible underflow condition or the absence of the underflow condition associated with a floating-point multiply-add operation represented by the numbers (ea, eb, ec, emin, N1, and N2). The prediction produced by the prediction unit 204 is "pessimistic" in that it predicts that an underflow condition will result in all situations where an underflow condition will result. However, the prediction unit 204 also predicts that an underflow condition might result in some situations where an underflow condition will not result.

Figure 4:
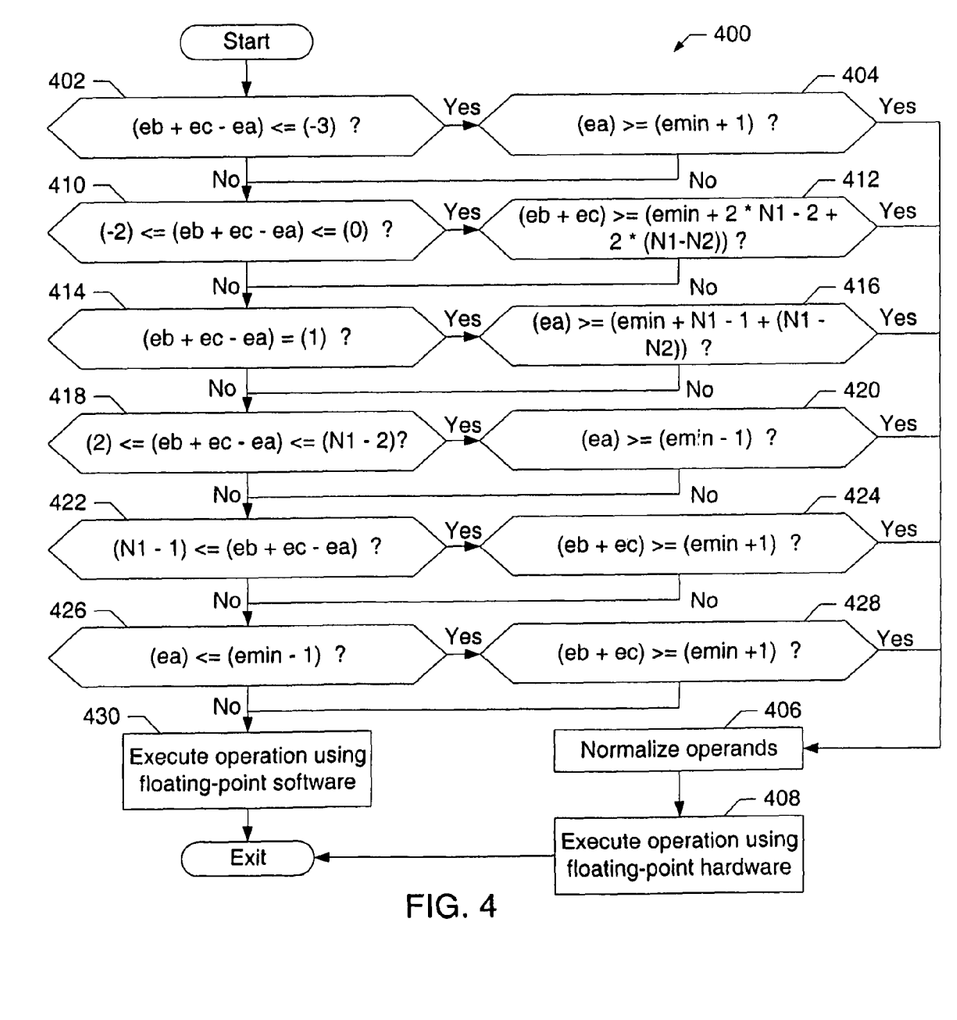
FIG. 4 is a flowchart of a process for predicting an underflow condition associated with a floating-point multiply-add operation.

As mentioned above, the prediction unit 204 may be implemented in hardware or software. A flowchart of a process 400 for predicting an underflow condition associated with the floating-point multiply-add operation is illustrated in FIG. 4. Preferably, the process 400 is embodied in a software program which is stored in the memory 108 and executed by the CPU 104 in a well known manner. However, some or all of the components of the process 400 may be performed by another device. Although the process 400 is described with reference to the flowchart illustrated in FIG. 4, a person of ordinary skill in the art will readily appreciate that many other methods of performing the acts associated with process 400 may be used. For example, the order of many of the blocks may optionally be changed. In addition, many of the blocks described are optional.

Generally, the process 400 causes the CPU 104 to predict an underflow condition associated with a floating-point multiply-add operation in certain circumstances. Again, the prediction is preferably "pessimistic" in that it predicts that an underflow condition might result in all situations where an underflow condition will result, but also predicts that an underflow condition might result in some situations where an underflow condition will not result.

Although the tests may be performed in any order, the process 400 depicted in FIG. 4 begins by causing the CPU 104 to test if $(eb+ec-ea)<=(-3)$ (block 402). If the test in block 402 produces a true result, the process 400 causes the CPU 104 to test if $(ea)>=(emin+1)$ (block 404). If both block 402 and block 404 produce a true result, the process 400 causes the CPU 104 and/or the normalizer 206 to normalize the operands if necessary (block 406) and perform the floating-point multiply-add operation using the floating-point hardware unit 208 (block 408).

If necessary, the process 400 also causes the CPU 104 to test if $(-2)<=(eb+ec-ea)<=(0)$ (block 410). If the test in block 410 produces a true result, the process 400 causes the CPU 104 to test if $(eb+ec)>=(emin+2*N1-2+2*(N1-N2))$ (block 412). If both block 410 and block 412 produce a true result, the process 400 causes the CPU 104 and/or the normalizer 206 to normalize the operands if necessary (block 406) and perform the floating-point multiply-add operation using the floating-point hardware unit 208 (block 408).

If necessary, the process 400 also causes the CPU 104 to test if $(eb+ec-ea)=(1)$ (block 414). If the test in block 414 produces a true result, the process 400 causes the CPU 104 to test if $(ea)>=(emin+N1-1+(N1-N2))$ (block 416). If both block 414 and block 416 produce a true result, the process 400 causes the CPU 104 and/or the normalizer 206 to normalize the operands if necessary (block 406) and perform the floating-point multiply-add operation using the floating-point hardware unit 208 (block 408).

If necessary, the process 400 also causes the CPU 104 to test if $(2)<=(eb+ec-ea)$ (block 418). If the test in block 418 produces a true result, the process 400 causes the CPU 104 to test if $(N1-2)$ and $(ea)>=(emin-1)$ (block 420). If both block 418 and block 420 produce a true result, the process 400 causes the CPU 104 and/or the normalizer 206 to normalize the operands if necessary (block 406) and perform the floating-point multiply-add operation using the floating-point hardware unit 208 (block 408).

If necessary, the process 400 also causes the CPU 104 to test if (N1−1)<=(eb+ec−ea) (block 422). If the test in block 422 produces a true result, the process 400 causes the CPU 104 to test if (eb+ec)>=(emin+1) (block 424). If both block 422 and block 424 produce a true result, the process 400 causes the CPU 104 and/or the normalizer 206 to normalize the operands if necessary (block 406) and perform the floating-point multiply-add operation using the floating-point hardware unit 208 (block 408).

If necessary, the process 400 also causes the CPU 104 to test if (ea)<=(emin−1) (block 426). If the test in block 426 produces a true result, the process 400 causes the CPU 104 to test if (eb+ec)>=(emin+1) (block 428). If both block 426 and block 428 produce a true result, the process 400 causes the CPU 104 and/or the normalizer 206 to normalize the operands if necessary (block 406) and perform the floating-point multiply-add operation using the floating-point hardware unit 208 (block 408).

If an underflow condition is predicted by the prediction unit 204 (i.e., if the process flow continues to block 430), the process 400 causes the CPU 104 to perform the floating-point multiply-add operation using the floating-point software unit 210 (block 430).

In summary, persons of ordinary skill in the art will readily appreciate that methods and apparatus for predicting an underflow condition associated with the floating-point multiply-add operation have been provided. Systems implementing the teachings described herein may benefit from reduced computational overhead when performing floating-point multiply-add operations using both hardware and software floating-point units.

The foregoing description has been presented for the purposes of illustration and description. It is not intended to be exhaustive or to limit the invention to the examples disclosed. Many modifications and variations are possible in light of the above teachings. It is intended that the scope of the invention be limited not by this detailed description of examples, but rather by the claims appended hereto.

What is claimed is:

1. A processor comprising:
a register set to store a first operand exponent value, a second operand exponent value and a third operand exponent value; and
an underflow prediction circuit comprising:
a first logic to determine if the first operand exponent value subtracted from a first value comprising a mathematical equation including a second operand exponent value and a third operand exponent value is less than a first predefined value;
a second logic to determine if the first operand exponent value is greater than or equal to a second predefined value;
a third logic to assert an output signal indicative of an absence of an underflow condition associated with a floating-point value responsive to the first logic determining that first operand exponent value subtracted from the first value comprising the mathematical equation is less than the first predefined value and the second logic determining that the first operand exponent value is greater than or equal to the second predefined value;
a fourth logic to determine if the first operand exponent value subtracted from the first value is no less than a third predefined value and no greater than a fourth predefined value;
a fifth logic to determine if that the first value is greater than or equal to a fifth predefined value; and
a sixth logic to asset the output signal indicative of the absence of an underflow condition associated with the floating-point value responsive to:
the third logic not to assert the output signal indicative of the absence of an underflow condition;
the fourth logic determining that the first operand exponent value subtracted from the first value is no less than the third predefined value and no greater than the fourth predefined value; and
the fifth logic determining that the first value is greater than or equal to the fifth predefined value.

2. A processor as defined in claim 1, wherein the first predefined value comprises −3 and wherein the second predefined value comprises a sum of 1+a predefined minimum value for the first, second, and third operand exponent values.

3. A processor as defined in claim 1 further comprising a floating point hardware unit logic to perform a floating-point multiply-add operation using the first, second, and third operand exponent values if the output signal is asserted.

4. A processor as defined in claim 1 wherein the mathematical equation of the second operand exponent value and the third operand exponent value comprises a sum of the second operand exponent value and the third operand exponent value.

5. A processor as defined in claim 1, wherein the third predefined value comprises −2 and wherein the fourth predefined value comprises 0.

6. A processor as defined in claim 1, wherein the fifth predefined value comprises a third mathematical equation including a predefined minimum value for the first, second, and third operand exponent values.

7. A processor as defined in claim 6, wherein the third mathematical equation further include a first number of significant bits (N1) and a second number of significant bits (N2).

8. An apparatus comprising:
a register set for storing a first operand exponent value, a second operand exponent value and a third operand exponent value; and
an underflow prediction circuit comprising:
a first logic to assert an output signal indicative of an absence of an underflow condition associated with a floating-point operation based on a comparison of a first comparison value with a second comparison value, and a third comparison value with a fourth comparison value;
wherein the first comparison value is associated with a minimum operand exponent value, and wherein the second comparison value is to be compared with the first operand exponent value;
wherein the third comparison value comprises a first mathematical equation including the first operand exponent value, second operand exponent value, and third operand exponent value, wherein the fourth comparison value comprises a first predefined integer value; and
a second logic to assert the output signal indicative of the absence of an underflow condition associated with the floating-point operation based on:
the first logic not to assert the output signal indicative of the absence of an underflow condition;
a comparison of the third comparison value with a range of values, and a fifth comparison value with a sixth comparison value; and
wherein the fifth comparison value comprises a second mathematical equation including the second operand exponent value and third operand exponent value, and wherein the sixth comparison value is associated with the minimum operand exponent value.

9. An apparatus as defined in claim 8 further comprising logic to perform a floating-point multiply-add operation in response to the output signal.

10. An apparatus as defined in claim 8, wherein the output signal is indicative of the absence of an underflow condition associated with a floating-point multiply-add operation.

11. An apparatus as defined in claim 8, comprising:
a processor; and
a memory coupled to the processor and having instructions stored thereon.

12. A apparatus as defined in claim 8, wherein the range of values comprises a range of integers with the lowest value being −2 and highest value being 0.

13. A processor as defined in claim 8, wherein the second mathematical equation comprises a sum of the second operand exponent value and the third operand exponent value.

14. A apparatus as defined in claim 8, wherein the sixth comparison value is further associated with a first number of significant bits (N1) and a second number of significant bits (N2).

* * * * *